(12) United States Patent
Mueller et al.

(10) Patent No.: US 11,084,421 B2
(45) Date of Patent: Aug. 10, 2021

(54) LIGHTING DEVICE FOR A VEHICLE

(71) Applicant: Bayerische Motoren Werke Aktiengesellschaft, Munich (DE)

(72) Inventors: Michael Mueller, Munich (DE); Robert Isele, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 244 days.

(21) Appl. No.: 16/152,570

(22) Filed: Oct. 5, 2018

(65) Prior Publication Data

US 2019/0039513 A1 Feb. 7, 2019

Related U.S. Application Data

(63) Continuation of application No. PCT/EP2017/056606, filed on Mar. 21, 2017.

(30) Foreign Application Priority Data

Apr. 6, 2016 (DE) .................... 10 2016 205 684.0

(51) Int. Cl.
*B60Q 3/64* (2017.01)
*F21S 43/14* (2018.01)
(Continued)

(52) U.S. Cl.
CPC .............. *B60Q 3/64* (2017.02); *B60Q 3/60* (2017.02); *B60Q 3/76* (2017.02); *F21S 43/14* (2018.01); *G02B 6/0028* (2013.01)

(58) Field of Classification Search
CPC .... B60Q 3/62; B60Q 3/64; F21S 41/24; F21S 10/005; G02B 6/0021; G02B 6/001; G02B 6/0023
See application file for complete search history.

(56) References Cited

U.S. PATENT DOCUMENTS 5,678,914 A * 10/1997 Dealey .................... B60Q 3/66
362/485
6,594,417 B1 * 7/2003 Hulse .................... G02B 6/001
362/487
(Continued)

FOREIGN PATENT DOCUMENTS

CN 101501540 A 8/2009
CN 102128380 A 7/2011
(Continued)

OTHER PUBLICATIONS

Chinese-language Office Action issued in Chinese Application No. 201780006307.4 dated Feb. 21, 2020 with English translation (14 pages).

(Continued)

*Primary Examiner* — Julie A Bannan
(74) *Attorney, Agent, or Firm* — Crowell & Moring LLP

(57) ABSTRACT

A lighting device for a vehicle includes a light source and a linear light emission element for emitting light, which is supplied by the light source via a coupling surface of the light emission element in the light emission element. A light conductor element is provided for distributing and/or directing light, which is supplied by the light emission element in the light conductor element. The light source is linear and is arranged so as to extend parallel to the light emission element so that light from the light source can be coupled to a longitudinal side of the light emission element in an in-coupling surface in the light emission element. The light emission element is arranged at least partially in one side of an open cavity of the light conductor element and force-fittingly and/or form-fittingly held and also can be detached from the light conductor element in a non-destructive manner.

16 Claims, 2 Drawing Sheets

(51) Int. Cl.
*F21V 8/00* (2006.01)
*B60Q 3/76* (2017.01)
*B60Q 3/60* (2017.01)

(56) References Cited

U.S. PATENT DOCUMENTS

| | | | |
|---|---|---|---|
| 7,264,367 B2* | 9/2007 | Hulse | F21K 9/00 362/231 |
| 7,575,499 B2* | 8/2009 | Tufte | G09F 13/22 446/219 |
| 8,322,883 B2* | 12/2012 | Cleaver | F21K 9/00 362/249.04 |
| 8,920,006 B2 | 12/2014 | de Lamberterie | |
| 9,033,565 B2 | 5/2015 | Pfeil et al. | |
| 10,088,118 B2 | 10/2018 | Naron et al. | |
| 2010/0027256 A1 | 2/2010 | Kinoshita | |
| 2010/0142226 A1 | 6/2010 | Vogt et al. | |
| 2011/0170304 A1* | 7/2011 | Fujita | G02B 6/0008 362/501 |
| 2013/0148373 A1 | 6/2013 | Bayersdorfer et al. | |
| 2014/0321139 A1* | 10/2014 | Bungenstock | F21S 41/10 362/511 |
| 2015/0219827 A1 | 8/2015 | Kim et al. | |
| 2015/0298604 A1* | 10/2015 | Pfeil | B60Q 3/78 362/511 |
| 2015/0331169 A1 | 11/2015 | Jang et al. | |
| 2016/0312973 A1* | 10/2016 | Brosinger | B60Q 1/34 |
| 2019/0039513 A1 | 2/2019 | Mueller et al. | |

FOREIGN PATENT DOCUMENTS

| | | |
|---|---|---|
| CN | 104121530 A | 10/2014 |
| DE | 10 2010 012 745 A1 | 9/2011 |
| DE | 10 2010 030 660 A1 | 12/2011 |
| DE | 20 2010 010 726 U1 | 1/2012 |
| DE | 10 2012 015 057 A1 | 1/2014 |
| DE | 10 2012 106 481 A1 | 1/2014 |
| DE | 10 2012 220 696 A1 | 5/2014 |
| DE | 10 2013 104 169 A1 | 10/2014 |
| DE | 10 2013 104 174 A1 | 10/2014 |
| DE | 10 2013 021 086 A1 | 6/2015 |
| EP | 1 101 655 A2 | 5/2001 |
| EP | 2 143 991 A2 | 1/2010 |
| EP | 2 530 372 A1 | 12/2012 |
| EP | 2 530 503 A1 | 12/2012 |

OTHER PUBLICATIONS

International Search Report (PCT/ISA/210) issued in PCT Application No. PCT/EP2017/056608 dated Jun. 7, 2017 with English translation (six (6) pages).

German-language Written Opinion (PCT/ISA/237) issued in PCT Application No. PCT/EP2017/056608 dated Jun. 7, 2017 (five (5) pages).

German-language Search Report issued in counterpart German Application No. 10 2016 205 685.9 dated Dec. 16, 2016 with partial English translation (11 pages).

International Search Report (PCT/ISA/210) issued in PCT Application No. PCT/EP2017/056606 dated May 19, 2017 with English translation (five (5) pages).

German-language Written Opinion (PCT/ISA/237) issued in PCT Application No. PCT/EP2017/056606 dated May 19, 2017 (six (6) pages).

German-language Search Report issued in counterpart German Application No. 10 2016 205 684.0 dated Aug. 6, 2016 with partial English translation (10 pages).

Chinese-language Office Action issued in Chinese Application No. 201780006408.1 dated Oct. 30, 2020 with English translation (14 pages).

Chinese-language Office Action issued in Chinese Application No. 201780006307.4 dated Jan. 26, 2021 with English translation (nine (9) pages).

* cited by examiner

LIGHTING DEVICE FOR A VEHICLE

CROSS REFERENCE TO RELATED APPLICATIONS

This application is a continuation of PCT International Application No. PCT/EP2017/056606, filed Mar. 21, 2017, which claims priority under 35 U.S.C. § 119 from German Patent Application No. 10 2016 205 684.0, filed Apr. 6, 2016, the entire disclosures of which are herein expressly incorporated by reference.

This application contains subject matter related to U.S. application Ser. No. 16/152,587, entitled "LIGHTING DEVICE FOR A VEHICLE," filed on even date herewith.

BACKGROUND AND SUMMARY OF THE INVENTION

The invention relates to a lighting device for a vehicle, comprising a light source, a line-shaped light emission element for emitting light that is input by the light source into the light emission element via an input coupling surface of the light emission element, and a light guide element for distributing and/or directing light that is input into the light guide element by the light emission element. The invention also relates to an interior design piece.

It is known to use contour line illumination for the interior illumination of a vehicle, which primarily has the purpose of accent illumination.

DE 10 2012 015 057 A1 discloses a lighting device for a vehicle, comprising a light source and a surface light guide, wherein the light emission of the light source is coupled into the surface light guide via an end face of a surface light guide in the form of a light input coupling surface.

DE 10 2010 030 660 A1 discloses an interior design piece for a vehicle, comprising a light guide, supplied by a light source, for emitting light and a stripe-shaped light guide element. The light guide element has a first and a second surface, wherein the first surface is one of the two largest surfaces of the light guide element. The second surface is a surface that differs therefrom and comprises an input coupling surface. The light guide element and the substantially circular light guide are arranged and embodied such that light from the light guide is able to be coupled into the light guide element via the input coupling surface in the planar first surface and coupled out via the second surface. Thereby, point and line illumination with small dimensions is provided.

EP 2 530 503 A1 discloses a lighting device having a bar-shaped light guide and a light source for coupling light into the light guide. The bar-shaped light guide has a stripe, extending in the longitudinal direction, having a light-refractive/scattering structuring for producing a main light direction in the sense of an image of the structuring which is enlarged for the observer due to curvature of the light guide cross section. The light exit is effected by a substantially circular-arc-shaped exit surface. The circular-arc-shaped exit surface is located substantially opposite the stripe having the light-refractive/scattering structuring. Light is coupled in at the front end or front ends of the bar-shaped light guide.

In these lighting devices, only static light effects are possible, i.e. the light source can be used to regulate the brightness between 0 and 100%, wherein the brightness of the light guide, however, always remains constant over the length thereof. In dependence on the light color output by the light source, it is moreover possible to achieve a specific color effect, which is likewise constant over the length of the light guide.

For expanded light staging it is necessary to backlight a contour line with a plurality of light sources in time-variable fashion. The integration of a plurality of light sources, however, is more expensive and more complicated than the solution having one or two light sources mounted at the front-side ends of the light emission element described in the introductory part. Moreover, a lighting device having a plurality of light sources requires a different setup than the simple variant with only one or two light sources at the front-side ends of the light emission element. However, the requirement of different component variants is undesired for cost reasons.

It is an object of the invention to provide a lighting device for a vehicle and an interior design piece, which is improved in terms of construction and/or function with respect to the solutions known from the prior art. In particular, independently of the number of the light sources installed in a lighting device, the intention is for as many non-variant components to be available as possible.

These objects are achieved by way of a lighting device and an interior design piece in accordance with embodiments of the invention.

The invention proposes a lighting device for a vehicle, comprising a light source, a line-shaped light emission element for emitting light that is input into the light emission element by the light source via an input coupling surface of the light emission element, and a light guide element, e.g. in the form of a scattering plate, for distributing and/or directing light that is input into the light guide element by the light emission element.

The lighting device is characterized in that the light source is line-shaped and arranged so as to extend parallel to the light emission element, with the result that light from the light source is able to be coupled into the input coupling surface into the light emission element at a longitudinal side of the light emission element. The light emission element is at least partially arranged in a cavity of the light guide element that is open on one side and is held with a force-fit and/or a form-fit and is releasable without destruction from the light guide element.

Due to the cavity, a mechanical receptacle for the light emission element and the light source assigned to the light emission element is provided. The light emission element can be "clipped into" the cavity, wherein secure retention of the light emission element is provided by way of a force-fit and/or form-fit. According to the variant proposed here, the light source is embodied to be line-shaped, such that at least over one section of the longitudinal extent of the light emission element light can be coupled laterally into the light emission element. It is consequently possible to attain dynamic light effects or light staging using the lighting device according to the invention.

Due to the fact that the light emission element is releasable without destruction from the cavity which serves as a receptacle, it is easily also possible for a simpler combination of line-shaped light emission element and light source to be arranged in the cavity. In such a simplified arrangement, it is for example possible for the light source to comprise merely a single light-emitting element which couples light into the front side of the light emission element.

Independently of the embodiment of the light emission element and the light source, the light guide element can be configured as a non-variant component. It is thus possible to sell the high-quality variant with the line-shaped light emission element as an optional feature, while the simpler variant with a single light-emitting unit of the light source can be kept for simpler design variants of a vehicle.

There is likewise the possibility of providing the lighting device with a higher quality design at a later point by exchanging the line-shaped light emission element including the light source.

According to an expedient embodiment, the light emission element is connected to the light source to form a light module, wherein the light module is releasable from the light guide element without destruction. In this way, the lighting device can be equipped simply optionally with a simple light module or a high-quality light module. The simple light module comprises a line-shaped light emission element with one or two light-emitting units of the light source at the front sides of the light emission element. By contrast, the high-quality light module comprises the line-shaped light emission element and the line-shaped light source, in particular with a plurality of light-emitting units which are arranged parallel to the light emission element.

According to a further expedient embodiment, the cavity has in cross section perpendicular to the extent direction of the light guide element at least sectionally a circular-arc shape, wherein the circular-arc section forms a concave light entrance surface of the light guide element for light exiting the light emission element. The circular-arc shape of the cavity takes account of the fact that light emission elements of a simple light module generally have a substantially circular cross section. This is necessary to be able to steer the light which is coupled in at the front side or sides via disturbance locations along the light emission element transversely to the longitudinal extent thereof out of the light emission element. The circular-arc shape of the cavity thus permits good mechanical retention and simple installation of the light emission element into the light emission element, although the circular-arc cross-sectional shape is rather a disadvantage for reasons of light propagation.

In order to be able to implement best possible coupling of the light from the light emission element into the light guide element, it is expedient in this connection if the light emission element has at least sectionally a circular-arc shape in a cross section perpendicular to the extent direction thereof, wherein the circular-arc section forms a convex output coupling surface for light exiting the light emission element. In particular, the concave light entry surface of the light guide element and the convex output coupling surface of the light emission element are matched to one another, such that they border one another—such that they closely conform to one another—if the light emission element is arranged in the cavity of the light guide element. Moreover, what is ensured by this embodiment is also that clipping the light emission element into the cavity of the light guide element is possible in a simple and error-tolerant manner.

In accordance with a further expedient embodiment, the cross-sectional shape of the light emission element in a cross section perpendicular to the extent direction thereof is matched to the shape of the cavity, wherein the cross-sectional shape of the light emission element outside the cavity is dependent on the embodiment and arrangement of the light source. Matching the cross-sectional shapes of different light emission elements to the shape of the cavity makes possible the force-fit and/or form-fit retention thereof and loss-free and directed coupling of light into the light guide element independently of the shape of the cross-sectional shape of respective light emission elements outside the cavity.

It is furthermore expedient if the light emission element in a cross section perpendicular to the extent direction has a first longitudinal dimension and a larger longitudinal dimension as compared to the first longitudinal dimension, wherein the first longitudinal dimension extends along the chord of the circular arc and the second longitudinal dimension extends transversely thereto. Due to the cross-sectionally elongate shape of the light emission element of a high-quality light module, a good mixture of different colors output by one or more light-emitting units can be achieved already within the light emission element. It is irrelevant here how the light source having the number of light-emitting units is arranged in relation to the opening of the cavity.

Another embodiment provides for the light emission element to be exchangeable for a light emission element that is circular or elliptical in cross section perpendicular to the extent direction and in which, at least at one end side of the light emission element, a point-shaped light source is arranged. This unit of light emission element and light source represents the already mentioned simple light module, which can be exchanged for the above-described high-quality light module in a simple manner.

A further embodiment provides the arc length of the circular arc of the cavity to be greater than half the outer circumference of the circle defining the circular arc. This ensures that the light emission element can be held in the cavity of the light guide element with a force-fit and/or form-fit, because the ends of the light guide element forming the cavity at least to some extent enclose the light emission element.

In order to simplify production and avoid damage during insertion of the light emission element into the cavity, it is expedient to form the light emission element from a flexible material.

According to a further expedient embodiment, provision may be made for the light guide element to be formed in one piece with a trim element consisting of opaque material. The light guide element, which can be formed for example from transmissive light-scattering material, such as polycarbonate, can be provided with the trim from opaque material, e.g. black or chromed ABS plastics, using a two-component injection molding process.

The invention furthermore proposes an interior design piece for a vehicle, comprising a lighting device. The interior design piece has the same advantages as those that were described previously in connection with the lighting device.

The interior design piece expediently comprises a decorative element in the form of a trim element.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
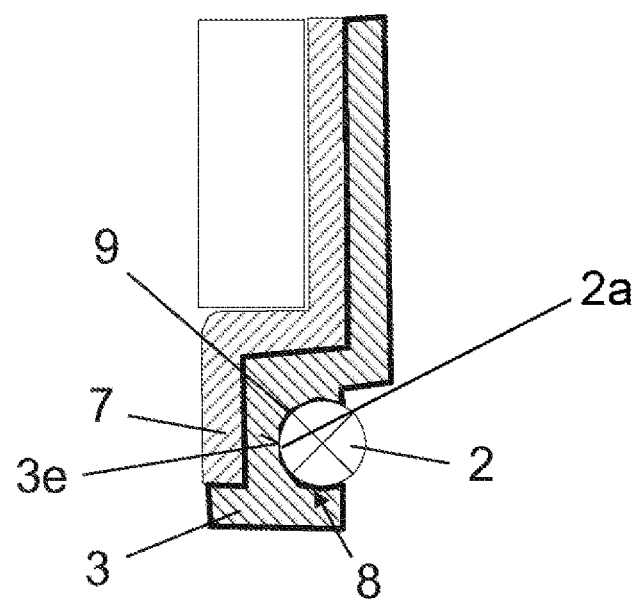
FIG. 1 is a cross section view through a lighting device according to an embodiment of the invention having a light module according to a first variant.
Figure 2:
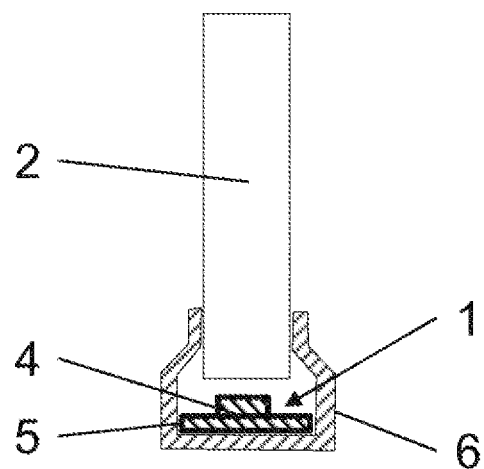
FIG. 2 is a view of the light module installed in FIG. 1 in a side view.

FIGS. 1 and 2 show a first exemplary embodiment of a lighting device for a vehicle according to the invention, which is used as an interior design piece, e.g. at the insides of the doors, for the vehicle. FIG. 1 shows a section through the lighting device, FIG. 2 a side view of a light module used in the lighting device in accordance with a first, simple variant.

The lighting device comprises a line-shaped (linear) light emission element 2, a scattering plate element 3 as a light guide element, and a decorative or trim element 7. The light emission element 2, the scattering plate element 3 and the trim element 7 extend parallel in FIG. 1 into the drawing plane. The light emission element 2 here has, by way of example, a substantially circular cross section. It consists of a plastic, e.g. PMMA, or glass and is clear or partially transparent.

The light emission element 2 is located in a cavity 8 of the scattering plate element 3. The cavity 8 has at least sectionally a circular-arc shape, wherein the circular-arc section 9 forms a concave light entry surface 3e of the scattering plate element 3 for light exiting the light emission element 2. The part of the light emission element 2 located inside the cavity 8 has a shape which is matched to the shape of the cavity 8. This means that the part of the light emission element 2 that is located in the cavity 8 likewise has an at least sectionally circular-arc shape. For this reason, the light output coupling surface 2a of the light emission element 2 and the light entry surface 3e of the light guide element 3 rest closely against one another, so that a targeted and predictable coupling of the light exiting the light emission element 2 into the scattering plate element 3 is ensured.

The arc length of the circular arc of the cavity 8 is here greater than half the outer circumference of the circle defining the circular arc, such that the cavity 8 encloses the light emission element 2 such that a force-fit and/or form-fit retention of the light module is provided. Due to the flexibility of the material of the scattering plate element 3, the light emission element 2 can be removed releasably from the cavity, without destroying or damaging the scattering plate element 3 in the process.

In the simple light module shown in FIG. 2, which represents a unit of the light emission element 2 and the light source 1, the light source 1 has a single light-emitting unit 4, e.g. in the form of a light-emitting diode (LED). The light emitting unit 4 in the form of a light-emitting diode is arranged on a carrier 5. This unit is connected in turn via a housing 6 to a free end of the light emission element 2, with the result that coupling in of light can be effected at the front side of the light emission element 2.

Figure 3:
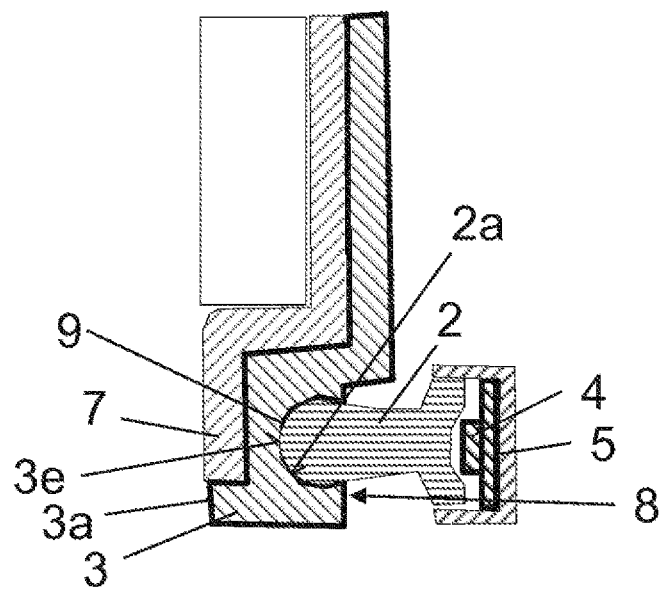
FIG. 3 is a cross section view through a lighting device according to an embodiment of the invention having a light module according to a second variant.
Figure 4:
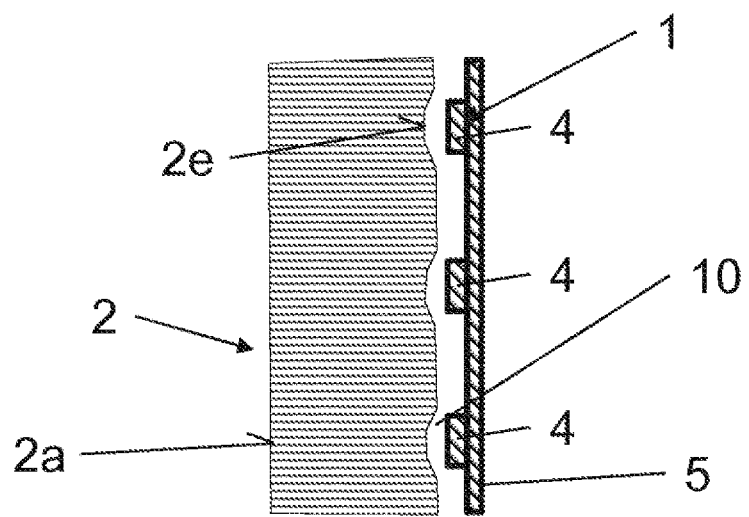
FIG. 4 is a view of the light module installed in FIG. 3 in a side view.

FIGS. 3 and 4 show a second exemplary embodiment of a lighting device according to the invention, wherein only the light module, comprising the light emission element 2 and the light source 1, is modified with respect to the simple light module from the exemplary embodiment in FIG. 1. The exchange of the simple light module of the first exemplary embodiment according to FIG. 2 for the higher quality light module in accordance with FIGS. 3 and 4 is made possible by the likewise sectionally circular-arc shape of the light emission element 2 which is embodied here to be substantially elongate in cross section. It is possible hereby to clip the light emission element 2 of the second variant into the cavity 8, wherein the circular-arc-shaped section that forms the light output coupling surface 2a borders the light entry surface 3e of the cavity 8 of the scattering plate element 3. A significant part of the light emission element 2 is here arranged outside the cavity.

In contrast to the preceding exemplary embodiment, the light source 1 in the second exemplary embodiment is in the form of a line and arranged parallel to the light emission element 2, such that light from the light source 1 can be coupled into the input coupling surface 2e of the light emission element 2 at a longitudinal side of the light emission element 2. By way of example, the light source 1 is opposite the opening of the cavity 8, although a lateral arrangement would also be possible. FIG. 4 shows a sectioned plan view of the light module of FIG. 3. What can be seen here is that, by way of example, three light-emitting elements 4 are arranged on a carrier 5. The light-emitting elements 4 come to rest in cutouts 10 of the light emission element 2 in order to couple light into the light emission element 2 here.

The trim element 7 in both variants consists of an opaque material, e.g. a black or chromed ABS plastic. The trim element 7 can be formed together with the scattering plate element 3, which is formed from transmissive, light scattering material, such as polycarbonate, in the two-component injection molding process.

Merely by clipping in the simple light module (FIGS. 1, 2) or the high quality light module (FIGS. 3, 4), it is thus possible to make available different variants of lighting devices for a vehicle. An invariable trim surround, which surrounds the trim element 7 and the scattering plate element 3, can be used here.

It is thus possible to implement various options with different light staging with the same geometric appearance at low cost.

Due to the ability of the light module to be exchanged, there is the possibility of exchanging a simple light module for a higher quality light module at a later point. As a result, modularity can be implemented.

LIST OF REFERENCE SIGNS 1 light source
2 light emission element
2e input coupling surface of the light emission element 2
2a output coupling surface of the light emission element 2
3 scattering plate element
3e entry surface of the scattering plate element 3
3a exit surface of the scattering plate element 3
4 light-emitting unit
5 carrier for a plurality of light-emitting units
6 housing
7 trim element
8 cavity
9 circular-arc section of the cavity 8
10 cutout The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A lighting device for a vehicle, comprising:
a first light source;
a first line-shaped light emission element for emitting light coupled into the first light emission element by the first light source via an input coupling surface of the first light emission element;
a light guide element for distributing and/or directing light coupled into the light guide element by the first light emission element, wherein
the first light source is line-shaped and arranged parallel to the first light emission element, such that light from the first light source is able to be coupled into the first light emission element via the input coupling surface at a longitudinal side of the first light emission element,
the first light emission element is arranged at least partially in a cavity of the light guide element which is open on one side and is held with a force-fit and/or a form-fit and is non-destructively releasable from the light guide element,
the first light source is arranged to couple light into the first light emission element opposite the opening of the cavity;
the lighting device is configured to interchange the first light emission element with a second light emission element,
the second light emission element is circular or elliptical in a cross section perpendicular to the extent direction and in which a second light source is point-shaped and arranged to couple light in to a front side of the second light emission element transversely to the opening of the cavity,
a greater proportion of the first light emission element is arranged outside of the cavity than a proportion of the second light emission element arranged outside of the cavity,
the cavity has at least sectionally a circular-arc shape in a cross section perpendicular to the extent direction of the light guide element,
the circular-arc section forms a concave light entry surface of the light guide element for light exiting the first light emission element, and
the arc length of the circular arc of the cavity is greater than half the outer circumference of the circle defining the circular arc.

2. The lighting device as claimed in claim 1, wherein
the first light emission element is connected to the first light source to form a light module, and
the light module is non-destructively releasable from the light guide element.

3. The lighting device as claimed in claim 1, wherein
the first light emission element and second light emission element have at least sectionally a circular-arc shape in a cross section perpendicular to the extent direction thereof, and
the circular-arc section forms a convex output coupling surface for light exiting the first light emission element and the second light emission element.

4. The lighting device as claimed in claim 3, wherein
the concave light entry surface of the light guide element and the convex output coupling surface of the first light emission element and the second light emission element are matched to one another such that they border one another if either the first light emission element or the second light emission element is arranged in the cavity of the light guide element.

5. The lighting device as claimed in claim 1, wherein
the cross-sectional shape of the first light emission element, in a cross section perpendicular to the extent direction thereof, is matched to the shape of the cavity, and
the cross-sectional shape of the first light emission element outside the cavity is dependent on the configuration and arrangement of the first light source.

6. The lighting device as claimed in claim 5, wherein
the first light emission element, in a cross section perpendicular to the extent direction, has a height dimension and a length dimension which is larger as compared to the height dimension, and
the height dimension extends along the chord of a sectionally circular arc shape of the first light emission element and the length dimension extends transversely thereto.

7. The lighting device as claimed in claim 1, wherein
the first light emission element is made of a flexible material.

8. The lighting device as claimed in claim 1, wherein
the light guide element is formed in one piece with a trim element made of opaque material.

9. An interior design piece for a vehicle, comprising a lighting device as claimed in claim 1.

10. The lighting device as claimed in claim 1, wherein
the first light source rests in an exterior cutout of the first light emission element,
the cutout is substantially in axial alignment with a sectionally circular-arc shape of the first light emission element, and
the input coupling surface of the first light emission element is an exterior input coupling surface.

11. The lighting device as claimed in claim 1, wherein
the second light source is configured to couple light into the second light emission element in the extent direction via the front side.

12. The lighting device as claimed in claim 1, wherein
the first light source rests in an exterior cutout of the first light emission element, and
the cutout is substantially in axial alignment with the cavity of the light guide element.

13. The lighting device as claimed in claim 1, wherein
the second light source is configured such that a direction in which the light is coupled out of the second light emission element is substantially transverse to the direction in which the light is coupled into the second light emission element.

14. The lighting device as claimed in claim 1, wherein
the input coupling surface of the first light emission element is substantially transverse to the front side of the second light emission element.

15. A lighting device for a vehicle, comprising:
a first light source;
a first line-shaped light emission element for emitting light coupled into the first light emission element by the first light source via an input coupling surface of the first light emission element;
a light guide element for distributing and/or directing light coupled into the light guide element by the first light emission element, wherein
the first light source is line-shaped and arranged parallel to the first light emission element, such that light from the first light source is configured to be coupled into the first light emission element via the input coupling surface along a longitudinal side of the first light emission element,
the first light emission element has at least sectionally a circular-arc shape cross section that forms a convex output coupling surface for light exiting the first light emission element and is configured to be arranged at least partially in a cavity of the light guide element having at least sectionally a circular-arc shape cross section that forms a concave light entry surface, the lighting device is configured to interchange the first light source and first light emission element with a second light source and a second light emission element, the second light emission element has at least sectionally a circular arc-shape cross section that forms a convex output coupling surface matching the convex output coupling surface of the first light emission element and matching the concave light entry surface of the cavity such that they border one another if either the first or second light emission element is arranged in the cavity of the light guide element, and a greater proportion of the first light emission element is arranged outside of the cavity than a proportion of the second light emission element arranged outside of the cavity.

16. A lighting device for a vehicle, comprising:

a light source;

a line-shaped light emission element for emitting light coupled into the light emission element by the light source via an exterior input coupling surface of the light emission element;

a light guide element for distributing and/or directing light coupled into the light guide element by the light emission element, wherein the light source is line-shaped and arranged parallel to the light emission element, such that light from the light source is able to be coupled into the light emission element via a cutout of the exterior input coupling surface at a longitudinal side of the light emission element, the light emission element is arranged at least partially in a cavity of the light guide element which is open on one side and is held with a force-fit and/or a form-fit and is non-destructively releasable from the light guide element, the light emission element, in a cross section perpendicular to the extent direction, has a height dimension and a length dimension which is larger as compared to the height dimension, the height dimension extends along a chord of a circular arc inside of the cavity and tapers to a reduced height dimension outside of the cavity of the light guide element that is less than the chord of the circular arc and less than a parallel height of the exterior input coupling surface, and the length dimension extends transversely from the chord of the circular arc.

* * * * *